Dec. 11, 1962   M. A. HERMAN   3,067,518
MASTER TYPE SQUARING FIXTURE
Filed April 2, 1958   2 Sheets-Sheet 1

INVENTOR.
MARTIN A. HERMAN
BY
ATTYS.

Dec. 11, 1962     M. A. HERMAN     3,067,518
MASTER TYPE SQUARING FIXTURE
Filed April 2, 1958     2 Sheets-Sheet 2

INVENTOR.
MARTIN A. HERMAN
BY
Oldham & Oldham
ATTYS.

United States Patent Office 3,067,518
Patented Dec. 11, 1962

3,067,518
MASTER TYPE SQUARING FIXTURE
Martin A. Herman, 7316 Dudley Ave., Cleveland 2, Ohio
Filed Apr. 2, 1958, Ser. No. 725,860
1 Claim. (Cl. 33—112)

This invention relates to squaring fixtures, and especially to an extremely accurate but readily adjustable squaring fixture for use in gauging actions.

Heretofore there have been several different types of squaring fixtures of the class described provided. Several of these fixtures have comprised either a cylinder or other member adapted to be positioned on a flat end and to present reference surfaces thereon that are exactly normal to the planar support surface provided for the fixture. However, insofar as I am aware, the previous types of fixtures provided in this field have been extremely difficult to adjust as they wear and become out of true square relationship between the vertically extending axis of the fixture and the originally planar support surface provided thereon normal to such longitudinal axis. No easily made adjustments or repairs have been possible in the commercially available types of fixture of this general type that I have seen produced heretofore.

The general object of the present invention is to provide a novel and improved squaring fixture characterized by the adjustability of an upright reference member therein to correct or adjust the position of such upright member should it not be in exactly normal relationship to a planar support surface provided in the fixture.

Another object of the invention is to provide a squaring fixture primarily made from a support base and an upright having a pair of planar, parallel side edges thereon wherein the upright is adapted to be secured to the base with the planar side faces of the upright being exactly normal to a planar support surface of the base.

A further object of the invention is to provide a squaring fixture that can be readily and easily adjusted should the flat reference surfaces thereon ever become out of exactly normal relationship to the support means for the fixture and thus to avoid any costly machining or other extremely accurate repairing operations on the gauge.

Another object of the invention is to provide an improved, lighter weight gauge or squaring fixture than previous types of similar gauges provided, and to produce a relatively inexpensive gauge that can be retained in exact operative positions for use as a squaring fixture over a long period of service life.

A further object of the invention is to use separate upright and base members in a squaring fixture and to have a pair of parallel planar surfaces on the upright and a planar support surface on the base as the only accurate surfaces required in the fixture.

The foregoing and other objects and advantages of the invention will be made more apparent as the specification proceeds.

Reference now should be had to the accompanying drawings, wherein.

When referring to corresponding parts shown in the drawings and referred to in the specification, corresponding numerals are used to facilitate comparison therebetween.

Figure 1:
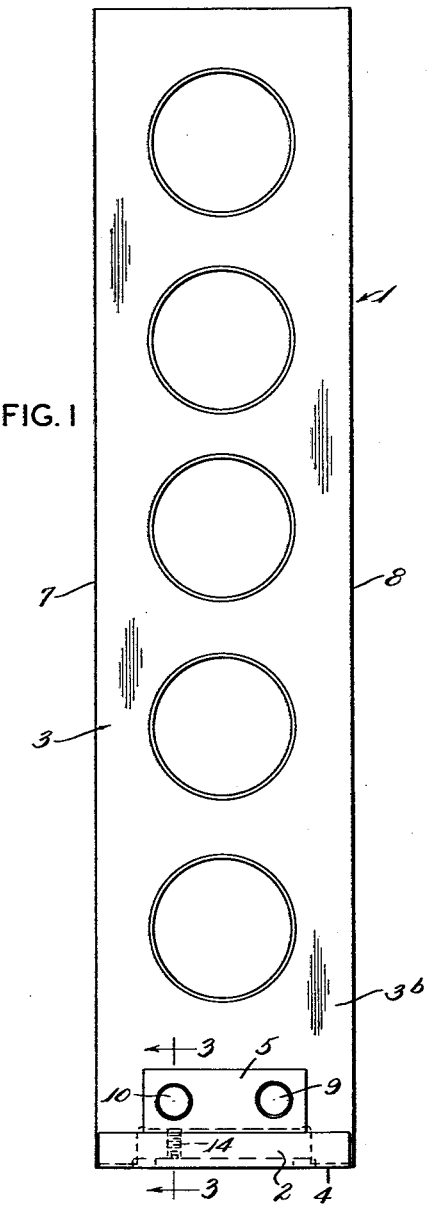
FIG. 1 is an elevation of a squaring fixture embodying the principles of the invention.
Figure 2:
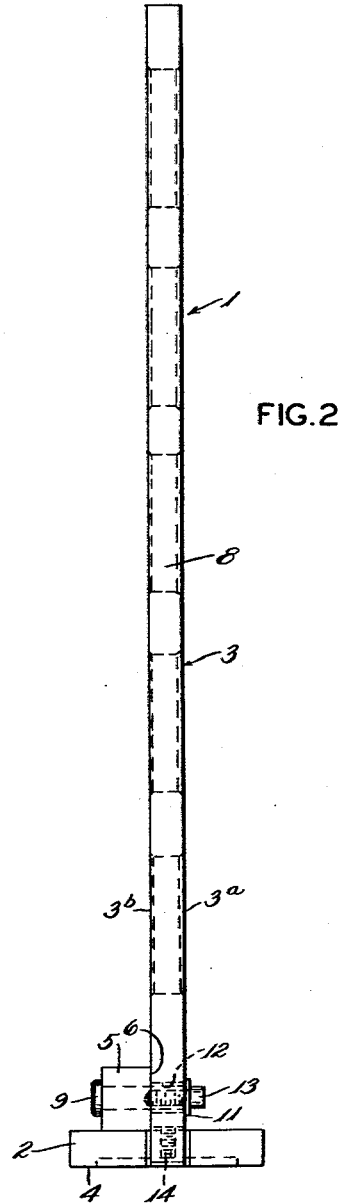
FIG. 2 is a right side elevation of the gauge of FIG. 1.

Generally speaking, the present invention relates to a squaring fixture including a base having a flat or planar supporting surface and an elongate thin upright having a pair of parallel side edges defining planes. This upright is secured to the base by suitable means with the side edges extending substantially normal to the flat base supporting surface but which means permit limited tilting or pivoting movement of the upright so that the side edges thereof can be placed in a plane exactly normal to the supporting surface, and means adjustably engage the base and bear on the upright for moving it into and retaining the upright in exactly normal relationship between the side edges and the planes defined thereby and the planar supporting surface of the base.

Particular attention now is directed to the details of the structure shown in the drawings, and a squaring fixture of the invention is indicated as a whole by the numeral 1. This squaring fixture 1 includes the primary elements of a base 2 and an upright 3. The base 2 is provided with a flat plane defining support surface 4 and the base has an upwardly extending shoulder 5 thereon, which shoulder 5 has a substantially vertically extending sidewall 6 thereon. It is important to note in producing the squaring fixture 1 of the invention that the base 2 must have an exactly flat or planar surface 4 provided thereon, but that the sidewall 6 of the shoulder 5 does not have to be exactly perpendicular with relation to this planar support surface so that production of the base is simplified. The squaring fixture 1 is, by its construction as hereinafter described, adapted to provide extremely accurate measurements for determining the squareness of a workpiece or other article to be checked. Thus the production of the base 2 does not become an extremely difficult operation inasmuch as this sidewall 6 which becomes one of the important surfaces in the base 2 does not have to be ground or otherwise shaped to be exactly normal to the support surface 4 for accurate operation in the squaring fixture of the invention.

The upright 3 in the squaring fixture is elongated and usually is relatively thin but with side edges 7 and 8 thereof being exactly parallel with each other and with each of such side edges being of a flat plane defining shape. This upright 3 is secured to the base 2 by means of headed cylindrical studs 9 and 10 that extend through apertures provided in the shoulder 5 of the base 2 and likewise extend through holes or bores 12, 12 the lower corners of the upright 3. These holes or bores 12, 12 extend from a face surface 3a to the back surface 3b of the upright 3. The stud 9 is snugly received in its hole in the upright 3, but the stud 10 is loosely received in the corresponding hole 12 in which it is positioned so that when these studs 9 and 10 are secured in position, as by means of cap screws 13, engaging the studs 9 and 10 and the upright, then the upright 3 is tightly secured to the base 2 with the back surface 3b of the upright being abutted against the vertical sidewall 6 of the shoulder 5. Usually suitable washers 11 are carried by the cap screws 13 but any desired bolt, screw or pin members can be used for securing the upright 3 to this substantially vertically extending sidewall 6 of the base 2. However, it is important that in all events the upright 3 is positioned for slight pivotal or tilting action in a plane normal to the parallel planes defined by the side edges 7 and 8 of the upright. The initial positioning of the upright 3 must be such that its longitudinal axis and its plane of movement are at least substantially normal to the supporting surface 4 and the plane defined thereby. In other words, the upright should be substantially vertically directed when the base surface 4 is horizontal.

Figure 3:
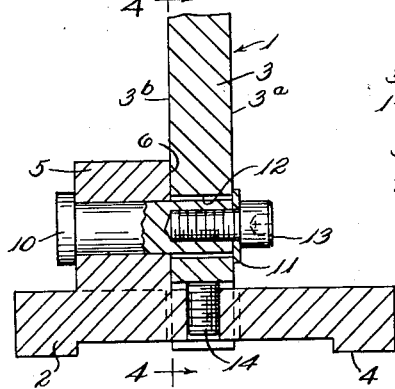
FIG. 3 is a fragmentary enlarged vertical section taken on line 3—3 of FIG. 1.
Figure 4:
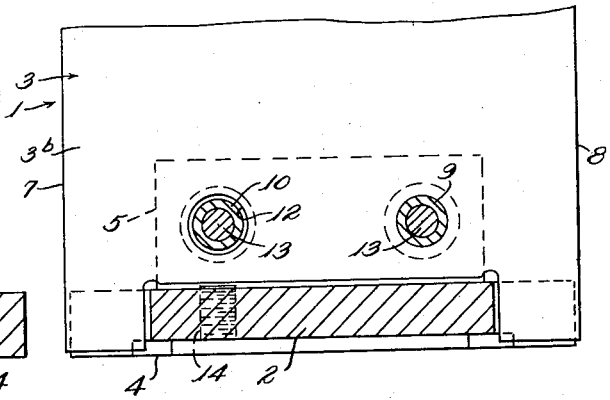
FIG. 4 is a fragmentary vertical section taken on line 4—4 of FIG. 3.

FIGS. 3 and 4 of the drawings clearly show that the stud 10 is appreciably smaller than the diameter of the hole 12 provided in the upright.

Some suitable adjusting member is provided in the base 2 immediately adjacent and below the portion of the upright 3 having the hole 12 provided therein. Thus the drawings, FIGS. 3 and 4, clearly bring out that a set screw 14, for example, engages a threaded aperture provided in the base 2 and with vertical adjustment of the set screw 14 bringing it into engagement with the lower end of the upright 3 to bear thereon. The set screw 14 is positioned as shown in FIGS. 3 and 4 substantially beneath the loose fitting stud 10 so that the adjustment of the set screw will not bend or distort the upright 3. Hence, if this stud 10 and cap screw 13 associated therewith are slightly loosened or even if they are fairly tightly positioned, still the set screw 14 can move the upright 3 slightly in an arc about the other stud 9. Thus by checking the vertical position of the upright 3 by the side faces 7 and 8, it can be brought into exact operative position. At such time, the side edges 7 and 8 and the planes defined thereby are exactly normal to the plane defined by the supporting surface 4 of the base 2. Therefore the squaring fixture 1 is ready for operative action and it can be used for reference purposes for accurate squaring or gauging action. Should it ever be necessary to repair or adjust the squaring fixture of the invention, it is relatively an easy, uncomplicated action to grind the side edges 7 and 8 and maintain them in exactly parallel relationship to each other. Thus each side edge 7 and 8 will define a plane, while it also is easy to maintain the supporting surface 4 of the base in exactly planar condition. It will be seen that even though the side wall 6 of the shoulder 5 does not extend exactly vertically, still the planes defined by the side edges 7 and 8 of the upright 3 will be exactly normal to the base 2, so much the better, and the gauge and squaring fixture will be even easier to use.

Figure 5:
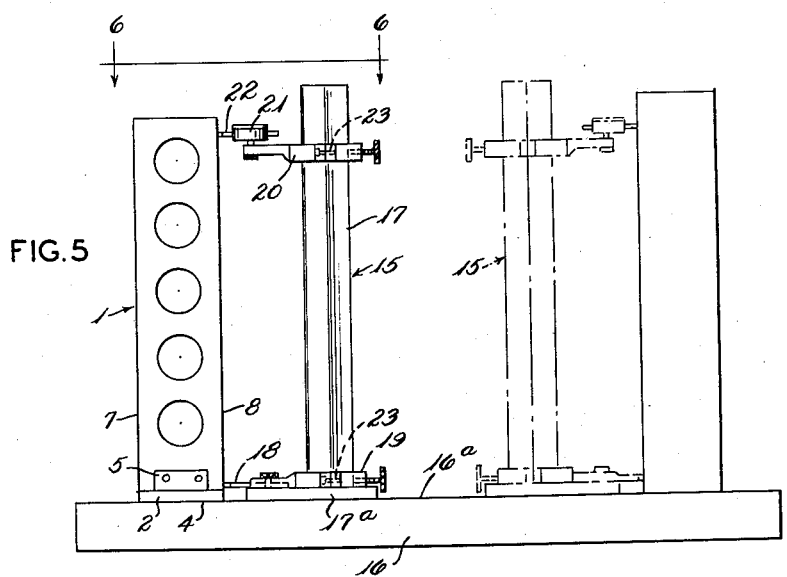
FIG. 5 is an elevation of the squaring fixture of the invention shown in association with a transfer or gauging member for use in checking a workpiece.
Figure 7:
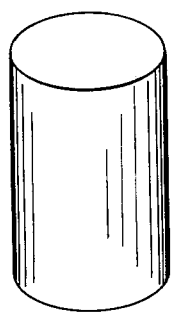
FIGS. 7 and 8 are perspective views of prior types of squaring fixtures.
Figure 8:
Figure 6:
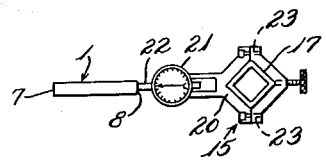
FIG. 6 is a plan view taken on line 6—6 of FIG. 5.

FIG. 5 of the drawings best illustrates how a reference or carrier gauge 15 is provided and is also supported on a base support 16 on which the base 2 of the squaring fixture 1 is positioned. Such support 16 naturally has an extremely accurate horizontal or flat surface 16a provided thereon for reference and support action. The reference gauge 15 thus likewise has a flat base support surface provided thereon and at least a substantially vertically extending support column 17 is provided for such reference gauge 15. A locater pin 18 is secured to the support column 17 by a support member or platform 19, FIG. 5. This support platform 19 and support column 17 are of the type shown and described in my co-pending patent application Serial No. 637,404 wherein a support column 17 of square shape in section is secured to the base member 17a to provide edges or corners for engagement with gauge carrying means. This locater pin 18 is vertically adjustable by means of the support platform 19 on the support column 17 but with the support platform 19 extending normally from the longitudinal axis of the support column and with the transverse axis of the support column or platform 19 lying on an extension of a diagonal of the support column 17. The locater pin 18 can be fixed in any desired relationship to the support platform 19 and be used for contacting one of the side edges 7 or 8 of the upright 3 for reference or gauging action.

Usually adjacent the upper end of the support column 17, a second support platform 20 is provided and it extends normally therefrom. Such support platform 20 positions an adjustable indicator gauge 21 thereon that can be used for extremely accurate measurements to indicate the position for a plunger or pin 22 movably and adjustably extending from the indicator gauge 21. Of course, the upright 3 has been checked to be certain that it is in proper square position in the squaring fixture 1. Thus the reference gauge 15 is brought into engagement with one of the side edges of the upright 3 and the indicator gauge 21 is adjusted until a zero reading is obtained thereon and both the plunger 22 and the locater pin 18 contact the edge of the upright 3. The initial accurate position of the upright 3 can be set by the set screw 14 by bringing the side faces 7 and 8 alternately into engagement with the reference gauge 15 to set the upright in its position with faces 7 and 8 normal to the surface 16a. Next the reference gauge 15 can be moved over into contact with the workpiece indicated at W. Hence, if the readings of the indicator gauge 21 are not the same when in contact with the work as when in contact with the upright 3, it is a clear indication that the work W is not in square relationship to the support surface of the support 16.

The support platforms 19 and 20 are secured to the support column by removable means, such as control screws 23 or the like that engage a portion of the support platform and retaining means therefor. Thus the support platforms can be readily clamped to the support column at desired vertical locations thereon and have the support platforms extend normally from the column at all instances.

The back face 3b of the upright 3 should be flat and should be normal to the planes of the side faces 7 and 8 for best use of the squaring fixture 1.

While one complete embodiment of the invention has been disclosed herein, it will be appreciated that modifications of this particular embodiment of the invention may be resorted to without departing from the scope of the invention as defined in the appended claim.

What is claimed is:

The combination in a master type squaring fixture of a base with a bottom planar surface, a single integral upstanding rib thereon having a vertically extending side wall, an upright in the form of a flat plate with parallel side edges, means pivotally securing a lower corner of the upright against the vertical wall of the rib, means releasably securing the other lower corner of the upright to the vertical side of the rib, and a single screw means positioned in the base beneath the releasable securing means for repositioning the upright in relation to the base by movement of the upright in a pivotal direction about the pivotal means.

References Cited in the file of this patent

UNITED STATES PATENTS

| 139,821 | Schaefer | June 10, 1873 |
| 392,426 | Hayden | Nov. 6, 1888 |
| 1,232,613 | Scheeder | July 10, 1917 |
| 1,300,427 | Lowenstein | Apr. 15, 1919 |
| 1,755,152 | Parker | Apr. 15, 1930 |
| 2,638,677 | Sheriff | May 19, 1953 |

FOREIGN PATENTS

| 1,046,962 | France | July 15, 1953 |

OTHER REFERENCES

Michelon: "Industrial Inspection Methods," Harper & Brothers, New York, 1950, page 300 relied on. Copy in Div. 66.